Sept. 18, 1951  W. L. HUNT ET AL  2,568,586
DISPLACEMENT OR TORQUE AMPLIFIER
Filed April 3, 1946
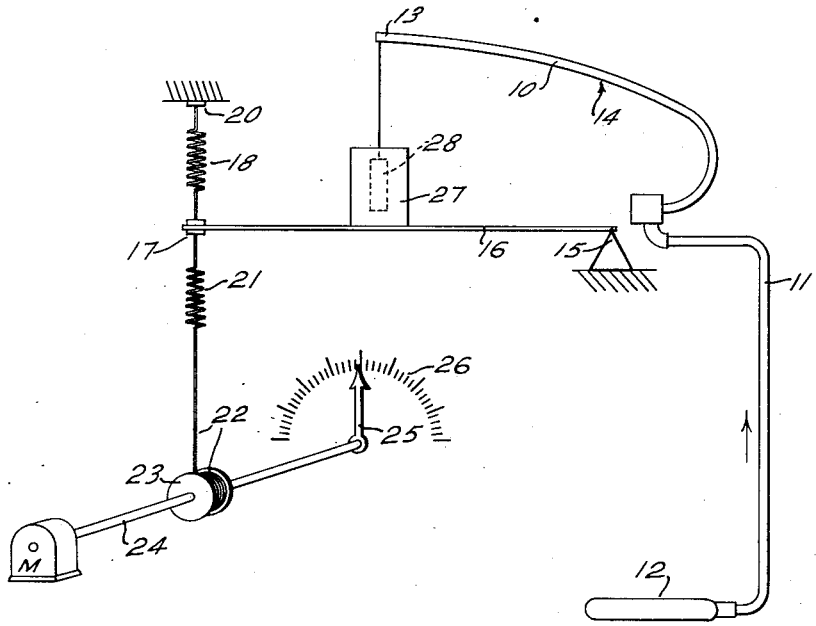
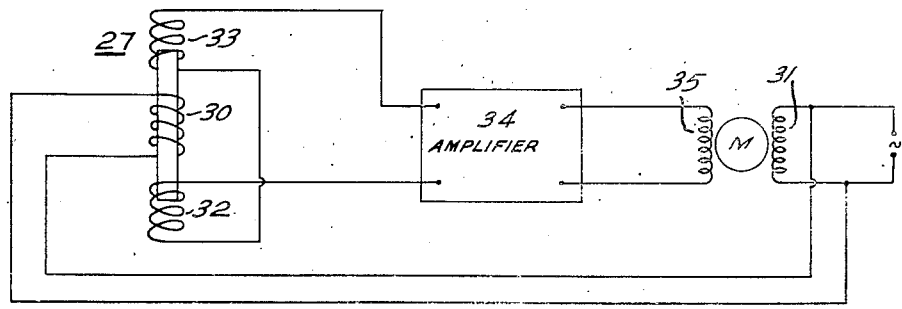
INVENTORS
WALTER LESLIE HUNT
WILLIAM D. MACGEORGE
BY
ATTORNEYS Patented Sept. 18, 1951

2,568,586

UNITED STATES PATENT OFFICE 2,568,586

DISPLACEMENT OR TORQUE AMPLIFIER

Walter Leslie Hunt, Philadelphia, and William Dean Macgeorge, Havertown, Pa., assignors to Automatic Temperature Control Co., Inc., Philadelphia, Pa., a corporation of Pennsylvania Application April 3, 1946, Serial No. 659,226

15 Claims. (Cl. 73—398)

This invention relates to displacement or torque amplifiers.

There are many situations in which small displacements or torques or the like are to be followed up and amplified for either indication or control purposes, and this invention is directed toward and pertains particularly to improved systems for the purpose.

It is among the objects of the invention: to provide a displacement or torque amplifier which is linear, frictionless and of practically unlimited range; to provide a system of the class described in which unbalance and the running of a motor for rebalancing occurs with extremely minute displacements; to provide improvements in a testing machine dial indicator system; to provide a proportional follow-up system incorporating a motor in which the motor speed decreases as the system approaches the control or null relation; to provide a proportional follow-up system using springs of differential stiffness to reduce mechanical motion in the follow-up system; to obviate contacts in follow-up systems; to provide a speed gradient which facilitates attainment of sharp balance without hunting; to simulate electrically a pneumatic balance follow-up system; and many other objects and advantages will become more apparent as the description proceeds.

In the accompanying drawing forming part of this description:

Fig. 1 represents a diagrammatic exemplification of the invention as incorporated, illustratively, in a testing machine dial and indicator assembly.

Fig. 2 represents a schematic wiring diagram of the system of Fig. 1.

Referring to Fig. 1, a Bourdon tube 10 is shown, the inlet of which is connected with any desired variable source of pressure, through a tube 11. For illustrative purposes only, a testing machine capsule 12, susceptible to deformation under varying compressive stresses of a testing machine otherwise not shown, is attached to the Bourdon tube by means of the tube 11. It will be understood that as the pressure on the capsule varies, the pressure effective in the Bourdon tube varies, and the free end 13 of the Bourdon tube 10 rises and falls in accordance with the respective increase or decrease of the pressure internally of the Bourdon tube and, therefore, as functions of the changes in pressure in capsule 12. It will be understood further that the Bourdon tube 10 flexes about an effective or substantial pivot 14, preferably in substantial vertical alignment with the pivot 15 of the balancing follow-up lever arm 16. The latter has a free end 17 and the attitude of the lever arm 16 on pivot 15 is as a result of a balance of vertical forces on the free end 17 of the arm 16. These vertical forces are developed respectively by two opposed tension springs of preferably relatively different stiffness. One is comprised by the upper tension spring member 18, attached at the upper end as at 20 to a fixed support rigid with the pivot 15, and with the lower end thereof attached directly to the end 17 of the arm 16. The other force is represented by the lower tension spring member 21 attached to the lower surface of the end 17 of arm 16 by its upper end, and its lower end is connected to a flexible cable member 22. The latter is wound about the drum or reel 23 in such manner, preferably, but illustratively merely, that, as viewed in Fig. 1, a counter-clockwise movement of the drum winds up a portion of the flexible connector 22 and increases the tension loading of the spring 21, while a clockwise movement unwinds or releases a portion of the flexible connector 22 to reduce the tension loading of the spring 21. It will be seen that from any condition of balance, as for instance, that shown in Fig. 1, an increase of the tension loading of the spring 21 will cause the balance of forces represented by the opposed tensions of springs 18 and 21 to occur with the free end 17 of the arm 16 at a vertically lower level than as shown in Fig. 1, while a decrease in the tension loading of the spring 21 will cause the balance of opposed tension forces to occur with the free end 17 of the arm 16 at a vertically higher level than as shown in Fig. 1. A reversible motor M, preferably of the two phase type is coupled to the indicator shaft 24, upon which the drum or reel 23 is splined. The shaft 24 carries an indicating pointer arm 25, which, in movements with the shaft, sweeps the arcuately disposed calibrations 26 of the dial of the device. Obviously, motor M and shaft 24 are also fixed relative to the pivot 15.

A differential transformer stator 27 is mounted on and moves with the pivoted lever arm 16 in vertical arcuate movements about the pivot 15. An armature 28, such as a small block of magnetic material is mounted on or carried by the free end of Bourdon tube 10, and this also has an arcuate vertical motion about the pivot 14. Obviously, the stator and armature mountings can be reversed. The arrangement is such that when the biasing forces are balanced on the lever arm 16, this coincides with balance in the output of the transformer, with the armature either symmetrically centered or disposed relative to the stator, or in a predetermined condition of unbalance and relative asymmetry, if this should be preferred.

The stator 27 is composed of a centrally disposed exciting coil or primary 30, preferably continuously in circuit with a source of alternating current, indicated in Fig. 2. One field 31 of the two phase motor M is also continuously in circuit with the same alternating current. The transformer stator 27 is also provided with the opposed series connected secondary coils 32 and 33 leading to an amplifier 34. The output of the amplifier 34 leads to the other field 35 of the motor M.

With the parts substantially as described, it will be seen that a pressure increase in the Bourdon tube tends to straighten the tube and imparts a slight lift to the armature 28, which effects a magnetic unbalance of the transformer in one sense and which produces an equivalent A. C. signal output delivered as an input to the amplifier 34. This small A. C. signal is then amplified and applied to the field 35 of the motor M. As the output of the secondaries is in amplitude a function of the degree of unbalance and in phase a function of the sense of unbalance, and as the amplifier has certain inherent phase-shifting characteristics, it will be observed that the signal current to the field 35 leads or lags the current in the field 31 by 90°, and the motor M runs in the proper predetermined direction with its speed proportional to the amplitude of the output of the secondaries. This means that the motor speed reduces as the unbalance of the transformer decreases, and the motor stops when the transformer becomes balanced and the output of the secondaries becomes substantially nil.

As the motor M runs, and through suitable reduction gears drives the shaft 24 to change the indication of the pointer arm 25 relative to the calibrations 26, with continuation of the assumption of a pressure increase in the Bourdon tube and consequent vertical elevation of the armature 28, the shaft 25 turns clockwise, and indicates the increase of pressure on the dial, while unwinding the flexible cable 22 from the drum and releasing some of the tension on spring 21. This unbalances the forces and enables the free end 17 of the lever arm 16 to be moved upwardly in accordance with the change in the balance of forces thereon, and the stator 27 of the transformer therefore moves upwardly toward restoration of symmetry and/or a balanced substantially null output from the transformer. When balance is achieved, as noted, this marks the stoppage of the motor M and the final setting of the indicating pointer 25 for that particular change of pressure in the Bourdon tube as a function of the change of pressure on capsule 12.

In further explanation, it is to be noted that there is preferably a carefully predetermined "stiffness" ratio or relationship between the tension springs 18 and 21. Illustratively only, but as a means of explaining this feature, the spring 18 is ten times as stiff as spring 21. Therefore, for each one-tenth of an inch that spring 21 moves, spring 18 will only move one hundredth of an inch. Therefore, the arm 16 will raise but slightly, its motion relative to that of the motor M being governed by (a) drum-diameter, (b) spring stiffness ratios, and (c) the lever arm ratio, as will be clear.

The sensitiveness, accuracy and efficiency of the system as disclosed will be appreciated, as will the fact that the movements of arm 16 as well as those of the end 13 of the Bourdon tube 10 will be extremely small and the frictional effects will be so minimized and wear will be so precluded that the efficient life of the system will be very long. In this connection and as an example, it may be pointed out that in using the system as a device for a testing machine dial, with oil as the actuating medium in the Bourdon tube and capsule, it has been discovered that relative motions of the armature and stator of millionths of an inch will result in motor operation and rebalancing. The delicacy of this rugged system will be apparent.

Additionally, the non-hunting nature of the system and the absence of contacts and relays and other customary concomitants of electrical follow-up systems, and the attainment by electrical means of the fine non-hunting balance of pneumatic follow-up systems by creating a speed gradient from the output of the transformer in its driving relation to the motor by which the motor speed reduces as the null point approaches, will appeal to those skilled in the art as a major advance in controlled follow-up systems.

Finally, it will be obvious that the degree and type of amplification within practical aspects or limits will finally govern the size of the selected motor and power imparted. That is, the degree of torque amplifications is flexible and dependent on practical uses. For example, being capable of amplifying an initial force of one inch grain per minute into a force of one horsepower.

We claim as our invention:

1. A follow-up system comprising a pressure-responsive unit, a lever, said unit and lever each comprising a movable element, a two part transformer formed of a stator and an armature comprising respectively transformer parts controlling the transformer output, said parts having one predetermined relative positioning of substantially no output, means coupling the respective parts with the respective elements for independent motions, means for moving the lever as a function of unbalanced forces on the lever to a position attained when the forces of the lever are balanced, and means responsive to a transformer output pursuant to actuation of the part coupled with said unit for unbalancing the forces on the lever to initiate follow-up motion thereof to re-attainment of said predetermined relative positioning with rebalancing of forces on said lever.

2. A follow-up system comprising a network, a two-phase motor in the network, an amplifier in the network having leads to the motor, a transformer comprising a stator in the network, the output leads of the secondaries of which are in opposing relation and connected to the amplifier as the input thereof, an exciting winding for the secondary coils in the network, said transformer including an armature, means mounting the armature for movement relative to the stator as functions of a control movement, second means mounting the stator for movement relative to the armature in response to an unbalance of opposed forces on the second means, said transformer having a substantially null output in one relative position of the stator and armature and a voltage output in other relative positions thereof, said motor running in response to the voltage output of said stator passing into said amplifier, and means operated by the motor in running for varying the amplitude of at least one of the opposing forces effective on said second means to unbalance said forces to cause follow-up motion of the stator toward the armature to restore the relative position of substantially null output from said secondaries to stop said motor, substantially coincident with the balancing of the forces on said second means.

3. A follow-up system comprising an electrical network, a reversible motor and a two part transformer in the network, said transformer parts comprising a relatively movable armature and stator in operative relation, said stator comprising two axially aligned hollow air-cored secondary coils and a primary winding coil in inductive relation to the secondary coils, said secondary coils connected in bucking output relation and so arranged that with the armature in a predetermined relatively symmetrical balanced disposition relative to the secondaries, the output from the transformer is substantially null with no pull between the two parts of the transformer, and with the armature moved toward an asymmetrical relation from the symmetrical disposition there is a resultant output from the secondary coils increasing from null in amplitude as a function of the displacement substantially without increasing the pull between the two parts of the transformer, means for coupling the primary of the transformer to a source of alternating current, means in the network coupling the output of the secondaries to the motor for running the motor in a direction related to the sense of unbalance of the transformer, means disposed for connection to an element movable in response to changes of condition of a variable operative to move one of the two parts of the transformer relative to the other to unbalance the transformer and cause a motor running unbalance, and means operative by the running of the motor for causing the other of the two parts of the transformer to follow up the movement of the first mentioned part to reestablish balance in the transformer.

4. In a testing machine, a source of pressure variable as a function of the progress of a test of the machine, a Bourdon tube operatively connected to the source of pressure and arranged to flex as a function of the variations in said pressure, a shaft mounted for oscillations, an indicator operatively associated with and variable in its readings as the shaft oscillates, a drum mounted on the shaft to turn therewith, a reversible motor operatively associated with the shaft to drive same, a lever having a pivot, said lever and said Bourdon tube each comprising a movable element, an upper spring engaging the free end of the lever to exert upward vertical tension on said lever, a lower spring engaging the free end of the lever to exert downward tension on said lever, a flexible connector wound on the drum and engaging the lower spring to vary the tension of the lower spring as a function of the rotative motions of the shaft, a two part transformer of which one part is a stator and one part is an armature, said parts arranged for a symmetrical relationship of substantially no output and arranged for relative movement to produce an output varying in phase with the sense of relative movement, means for respectively connecting the respective parts of the transformer with the respective movable elements, and means for connecting the output of the transformer with the motor to drive same in the proper direction to reestablish balance in the transformer by varying the tension on the lower spring and therefore the lever attitude at which a balance of forces between the upper and lower spring is attained.

5. A follow-up system responsive to small displacements, comprising a support, a lever pivoted to the support, a spring engaged between the lever and the support, a shaft journalled on the support, a drum on the shaft, a flexible cable wound on the drum, a second spring engaged between the flexible cable and the lever, a displacement device arranged for displacement in response to variations in the condition of a conditioned device, complemental differential transformer elements operatively associated respectively with the displacement device and with said lever and comprising a stator and an armature arranged for balanced null output from the transformer when the armature and stator are symmetrically balanced coincident with balance in the opposing forces operative on the lever from said respective springs, motor means in driving relation to said shaft, and means connecting the transformer with the motor to drive the latter as a function of an unbalance of the transformer to reestablish balance thereof by rotating said shaft.

6. A follow-up system responsive to small displacements, comprising a support, a lever pivoted to the support, a spring engaged between the lever and the support, a shaft journalled on the support, a drum on the shaft, a flexible cable wound on the drum, a second spring engaged between the flexible cable and the lever, a displacement device arranged for displacement in response to variations in the condition of a conditioned device, complemental differential transformer elements operatively associated respectively with the displacement device and with said lever and comprising a stator and an armature arranged for balanced null output from the transformer when the armature and stator are symmetrically baanced coincident with balance in the opposing forces operative on the lever from said respective springs, motor means in driving relation to said shaft, and means connecting the transformer with the motor to drive the latter as a function of an unbalance of the transformer to reestablish balance thereof by rotating said shaft, said springs being predeterminedly of different stiffnesses in order to minimize lever movement.

7. A follow-up system responsive to small displacements, comprising a support, a lever pivoted to the support, a spring engaged between the lever and the support, a shaft journalled on the support, a drum on the shaft, a flexible cable wound on the drum, a second spring engaged between the flexible cable and the lever, a displacement device arranged for displacement in response to variations in the condition of a conditioned device, complemental differential transformer elements operatively associated respectively with the displacement device and with said lever and comprising a stator and an armature arranged for balanced null output from the transformer when the armature and stator are symmetrically balanced coincident with balance in the opposing forces operative on the lever from said respective springs, motor means in driving relation to said shaft, and means connecting the transformer with the motor to drive the latter as a function of an unbalance of the transformer to reestablish balance thereof by rotating said shaft, said first mentioned spring being appreciably stiffer than said second mentioned spring in order to enable appreciable shaft and drum rotation before reestablishing the balance of forces on the lever and while the actual lever movement is minimal.

8. A follow-up system responsive to small displacements, comprising a support, a lever pivoted to the support, a spring engaged between the lever and the support, a shaft journalled on the support, a drum on the shaft, a flexible cable wound on the drum, a second spring engaged between the flexible cable and the lever, a displacement device arranged for displacement in response to variations in the condition of a conditioned device, complemental differential transformer elements operatively associated respectively with the displacement device and with said lever and comprising a stator and an armature arranged for balanced null output from the transformer when the armature and stator are symmetrically balanced coincident with balance in the opposing forces operative on the lever from said respective springs, motor means in driving relation to said shaft, and means connecting the transformer with the motor to drive the latter as a function of an unbalance of the transformer to reestablish balance thereof by rotating said shaft, said stator of the transformer comprising a pair of oppositely wound series-connected secondaries and a primary, with said primary arranged for connection with a source of A. C.

9. A follow-up system responsive to small displacements, comprising a support, a lever pivoted to the support, a spring engaged between the lever and the support, a shaft journalled on the support, a drum on the shaft, a flexible cable wound on the drum, a second spring engaged between the flexible cable and the lever, a displacement device arranged for displacement in response to variations in the condition of a conditioned device, complemental differential transformer elements operatively associated respectively with the displacement device and with said lever and comprising a stator and an armature arranged for balanced null output from the transformer when the armature and stator are symmetrically balanced coincident with balance in the opposing forces operative on the lever from said respective springs, motor means in driving relation to said shaft, and means connecting the transformer with the motor to drive the latter as a function of an unbalance of the transformer to reestablish balance thereof by rotating said shaft, said motor means comprising a two phase motor, one field of which is arranged for connection with a source of A. C., and the other field of which is arranged for energization with current which lags or leads that in the first mentioned field by approximately ninety degrees.

10. A follow-up system as claimed in claim 3 characterized by the fact that the resultant output increases in amplitude from null as a substantially linear function of the relative displacement of the armature.

11. A follow-up system as claimed in claim 3 characterized by having indicating means operatively coupled to and responsive to the running of the motor to indicate the condition of such variable.

12. A follow-up system as claimed in claim 3, characterized by the fact that the variable is pressure.

13. A follow-up system as claimed in claim 3, characterized by the fact that the variable is pressure, and indicating means are provided in operative driven relation to said motor to indicate the pressure of the pressure variable.

14. A follow-up system, comprising a condition-responsive movable element, a two part transformer formed of a stator and an armature comprising respectively complemental transformer parts for controlling the output of the transformer, one of said parts operably associated with said element and movable on a general path axis in response to element motion, means for moving said other part generally in line with said path axis in response to an unbalance of forces effective on said other part to one predetermined position relative to said one part at which the transformer has substantially no output and the forces on said other part are balanced, and means responsive to the transformer output arising from element-initiated movement of said one part from said predetermined relative position for unbalancing the forces effective on said other part to move the latter to reestablish said predetermined relative position of no output coincident with rebalance of the forces effective on said other part.

15. A follow-up system for operative association with an element movable in response to a change of condition of a variable, comprising a network for coupling to an alternating current supply, a two part transformer, one part comprising an armature consisting in its functional entirety of magnetizable material and one part comprising a stator consisting in its functional entirety of a primary winding in the network and a secondary winding in inductive relation to the primary winding and having two output leads in the network, said secondary winding comprising a plurality of axially aligned hollow air-cored coils, one of said windings being so organized that the output of the secondary winding is a resultant of bucking voltages of substantially opposite phase in its said leads, said armatures being substantially concentrically disposed within the aligned secondary coils and said parts having a predetermined relatively symmetrical balanced disposition at which the voltages of said leads are substantially cancelling and the output is substantially null with substantially no pull between the two parts of the transformer, said parts being susceptible to axial relative displacement from the symmetrical to an asymmetrical relative disposition whereby the voltage in one of said leads preponderates in amplitude over the voltage in the other of said leads causing a resultant voltage output from the secondary leads increasing in amplitude as a function of the displacement substantially without increasing the pull between the said parts, one of said parts arranged for connection to such element to effect relative displacement of the transformer parts as a function of a change of condition of such variable to establish a voltage output from said leads without appreciable reaction against the said elements due to the substantially complete absence of pull between the transformer parts in their operative assembly, an amplifier in the network, an input of which is supplied by said leads, and means for converting an input controlled output of said amplifier into follow-up motion of the other of said parts to cancel such relative displacement and restore said predetermined realtively symmetrical balanced disposition.

WALTER LESLIE HUNT.
WILLIAM DEAN MACGEORGE.

REFERENCES CITED

The following references are of record in the file of this patent:

UNITED STATES PATENTS

| Number | Name | Date |
| --- | --- | --- |
| 1,959,804 | Wittkuhns et al. | May 22, 1934 |
| 1,959,805 | Wittkuhns et al. | May 22, 1934 |
| 2,005,884 | Bernarde | June 25, 1935 |
| 2,050,629 | Quereau et al. | Aug. 11, 1936 |
| 2,067,953 | Spence | Jan. 19, 1937 |
| 2,404,868 | Sivertsen | June 30, 1946 |
| 2,452,862 | Neff | Nov. 2, 1948 |